United States Patent [19]

Morgan

[11] Patent Number: 5,182,979
[45] Date of Patent: Feb. 2, 1993

[54] LINEAR POSITION SENSOR WITH EQUALIZING MEANS

[75] Inventor: Denny E. Morgan, San Diego, Calif.

[73] Assignee: Caterpillar Inc., Peoria, Ill.

[21] Appl. No.: 844,024

[22] Filed: Mar. 2, 1992

[51] Int. Cl.⁵ .................. F01B 25/26; G01N 22/00
[52] U.S. Cl. .................................. 92/5 R; 91/1; 91/DIG. 4; 324/635
[58] Field of Search ............. 92/5 R; 91/1, DIG. 4, 91/361, 459; 324/633, 635, 636

[56] References Cited

U.S. PATENT DOCUMENTS

| | | | |
|---|---|---|---|
| 2,520,604 | 8/1950 | Linder | 324/636 |
| 3,589,177 | 6/1971 | Merlo | 73/116 |
| 3,726,191 | 4/1973 | Johnston et al. | 92/5 R |
| 4,365,503 | 12/1982 | Ho et al. | 73/3 |
| 4,588,953 | 5/1986 | Krage | 91/361 |
| 4,689,553 | 8/1987 | Haddox | 324/635 |
| 4,737,705 | 4/1988 | Bitar et al. | 91/1 |
| 4,757,745 | 7/1988 | Taplin | 91/361 |
| 4,901,628 | 2/1990 | Krage | 92/5 R |
| 4,987,823 | 1/1991 | Taplin et al. | 91/361 |

Primary Examiner—Edward K. Look
Assistant Examiner—Hoang Nguyen
Attorney, Agent, or Firm—James R. Yee

[57] ABSTRACT

An apparatus is adapted to detect the linear extension, velocity and acceleration of a hydraulic cylinder. The hydraulic cylinder defines a variable length coaxial resonant cavity. Under the control of a controller, an RF transmitting section and an RF receiving section are used to determine the resonant frequency of the cavity. The receiving section includes an equalizer circuit for compensating for the insertion losses of the hydraulic cylinder. The linear extension of the cylinder is determined as a function of the resonant frequency.

13 Claims, 3 Drawing Sheets

Fig_1_

LINEAR POSITION SENSOR WITH EQUALIZING MEANS

TECHNICAL FIELD

This invention relates generally to an apparatus for determining the position of a piston and piston rod within a housing and, more particularly, to an apparatus for determining the piston's position using radio frequency (RF) signals.

BACKGROUND ART

In the field of hydraulic cylinders, a variety of systems have been proposed in which the displacement of the elements of the cylinder is electrically sensed and displayed or used to perform control functions. Conventional transducers have serious deficiencies, owing in part to difficulties in mounting the units and the harsh environmental conditions to which they are exposed. Transducers used on hydraulic systems in the heavy equipment industry are particularly subject to damage from the severe work environment. Hydraulic cylinders are typically located in relatively unprotected areas and are subject to, for example, high g-forces, wide temperature variations, dust, water, debris, etc., which can result in both electrical and mechanical failure.

One attempt to provide a sensor which is particularly suitable for the heavy equipment industry uses radio frequency (RF) signals. One such system is disclosed in U.S. Pat. No. 4,737,705 issued Apr. 12, 1988 to Bitar, et al. Bitar transmits a ramping RF signal into a coaxial resonant cavity formed by the hydraulic cylinder. When the cylinder's resonant frequency is transmitted, the signal detected by a receiving antenna reaches a peak. The resonant frequency has a one to one relationship with the cylinder's extension. Thus, by determining the cylinder's resonant frequency, the cylinder's linear extension can be determined.

The peak of the received signal is detected through comparison with a threshold value. The resonant frequency is determined by modifying the measured frequency of the transmitted signal to adjust for the difference between the threshold and the actual peak. This adjustment adds error into the position determination since the difference between the transmitted signal and the actual resonant frequency varies with the resonant frequency, the accuracy of the threshold value, and the size and shape of the cylinder.

The frequency of the transmitted signal is measured by determining the period of a number of cycles of the transmitted signal. When the threshold is reached, Bitar keeps the frequency constant. This also adds error since the extension of the cylinder may be changing, thereby also changing the resonant frequency of the cavity. Additionally, error is introduced by noise in the system and frequency drift of the transmitter.

Furthermore, error is introduced through the threshold value. The received waveform will vary in magnitude and shape depending upon the resonant frequency. If a constant threshold is used, error between the transmitted signal (at which peak is detected) and the actual resonant frequency will vary at different resonant frequencies, i.e., different cylinder extensions. This varying error negatively affects the accuracy, dependability, and repeatability of the sensor.

The present invention is directed at overcoming one or more of the problems as set forth above.

DISCLOSURE OF THE INVENTION

In one aspect of the present invention, an apparatus for detecting a linear position of a piston and a piston rod is provided. The piston and piston rod are movable within a housing of a hydraulic cylinder. The apparatus delivers an electromagnetic signal into the hydraulic cylinder and senses an electromagnetic wave signal within the hydraulic cylinder, equalizes the received electromagnetic signal, and compares the equalized electromagnetic wave signal with a predetermined constant. The apparatus determines the linear extension of the cylinder as a function of the frequency signal.

BEST MODE FOR CARRYING OUT THE INVENTION

Figure 1:
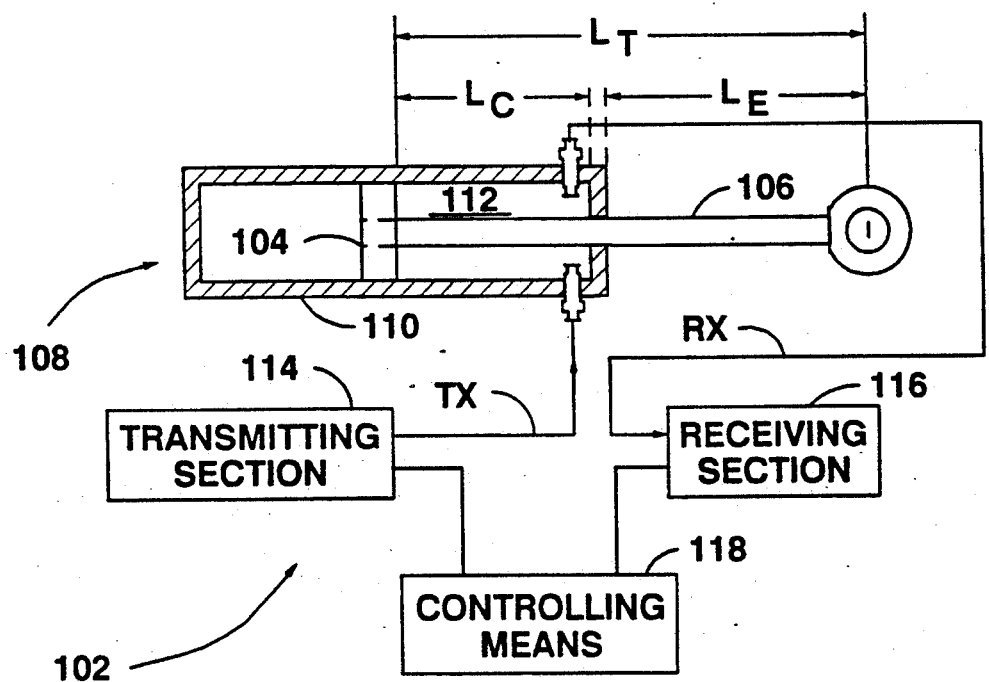
FIG. 1 illustrates a block diagram of a radio frequency (RF) linear position sensor, according to an embodiment of the present invention having a transmitting section, a receiving section, and a controlling means.

With reference to FIG. 1, the present invention, apparatus 102, is adapted to determine the position of a piston 104 and a piston rod 106 of a conventional hydraulic cylinder 108. The apparatus 102 may also be used to determine the velocity and acceleration of the piston 104 and piston rod 106. The linear extension of a hydraulic cylinder can be determined using RF signals using a variety of apparatus and method. One such system is disclosed in U.S. application Ser. No. unassigned, entitled "Linear Position Sensor Using a Coaxial Resonant Cavity", filed Dec. 23, 1991 by Bitar et al. (corresponding PCT Application No. PCT/US 91/09559, filed Dec. 23, 1991), which is incorporated herein.

The piston rod 106 has a total length, $L_T$, and is movable within a housing 110 of the hydraulic cylinder 108. The piston rod 106 and the housing 110 form a variable coaxial cavity 112.

The length of the cavity 112, $L_C$, is equivalent to the total length, $L_T$, minus the length of the extended portion of the piston rod 106, $L_E$, plus the thickness of the end wall of the housing 110. Thus, by determining the length of the cavity, $L_C$, the extended length, $L_E$, can be directly derived and used as an indicator of the extension of the piston rod 106. The apparatus 102 detects the position of the piston 104 and piston rod 106 relative to the housing 110 for the purpose of either directly displaying the detected position or for use in a system which seeks to control the position of, for example, a work implement of a construction vehicle.

A means 114 or transmitting section produces an electromagnetic signal and delivers the electromagnetic signal into the coaxial resonant cavity 112. The electromagnetic signal has a frequency which varies between a predetermined minimum and a predetermined maximum value, for example, 50 megahertz (MHz) to 1.6 gigahertz (GHz). The transmitting section 114 includes a coupling element 122. The coupling element 122 may include an antenna, an electric or a magnetic field probe or a direct connection to the piston rod 106. Preferably, the coupling element 122 is a loop antenna. The loop antenna 122 may enter the cavity 112 from the cylinder head or the cylinder wall. In one embodiment, the loop antenna 122 enters the cavity 112 and is electrically connected to the inner surface of the side wall of the housing 110 or the cylinder head. In another embodiment, the loop antenna 122 enters the cavity 112 and is electrically connected to the piston rod 106.

A means 116 or receiving section senses an electromagnetic wave signal from within the coaxial cavity 112. The means 116 detects a slope intercept condition (between the received signal and a threshold) of the electromagnetic wave signal and produces a frequency signal in response to the frequency of the electromagnetic signal corresponding to the slope condition. A slope intercept condition is defined as the intercept between the detected voltage vs. frequency curve and the threshold voltage.

In one embodiment, the means 116 detects a positive slope intercept condition and responsively produces a first frequency signal and subsequently detects a negative slope intercept condition and responsively produces a second frequency signal. A positive slope intercept condition occurs on the low side of the resonant frequency. A positive slope intercept condition occurs on the low frequency side of the resonance and a negative slope intercept condition occurs on the high frequency side of the resonance.

In another embodiment, the means 116 detects a slope intercept condition of the electromagnetic wave signal, tracks the frequency of the slope intercept condition and responsively produces a first frequency signal. The receiving section 116 includes a receiving coupling element 120. Preferably, the receiving coupling element 120 is a loop antenna, as described above.

A controlling means 118 receives the frequency signals and responsively determines the position of the piston and piston rod 104,106. Additionally, the position determining means 118 includes means for determining the velocity and acceleration of the piston and piston rod 104,106.

The coaxial resonant cavity 112 has a response similar to a coaxial transmission line with shorted ends. The hydraulic cylinder 108 includes an electrically conductive ring (not shown) to provide electrical connection between the housing 110 and the piston rod 106.

When excited by radio frequency (RF) signal, the cavity 112 has a high insertion loss except near resonant frequencies. More specifically, if the length, $L_C$, of the cavity 112 is an integer multiple of half the wave length of the signal delivered into the coaxial cavity 112, then some RF energy is coupled into the cavity 112 exciting a transverse electromagnetic (TEM) field which can best be described as the superposition of two waves propagating along the coaxial cavity 112. The presence of this time varying electromagnetic field in the cavity 112 causes the receiving coupling element 120 to detect a signal of the same frequency. Each integer multiple is known as a harmonic or resonant frequency.

The resonant frequency of an ideal coaxial cavity is given by the equation:

$$f_{res} = \frac{n}{2}\left(\frac{c}{(E_r)^{\frac{1}{2}}} \times \frac{1}{L_c}\right) \qquad \text{EQU. 1}$$

$(n = 1, 2, 3 ...)$ where $c = 3 \times 10^{10}$ cm/s, $f_{res}$ is the excitation frequency, and $E_r$ is the relative permittivity of the fluid within the cavity. The first harmonic corresponds to $n=1$, the second harmonic corresponds to $n=2$, etc.

The resonant frequency of the coaxial cavity 112 differs from that of the ideal equation owing to deviations in the geometry of the cavity 112, and from the effect of the actual coupling structure. However, a one-to-one relationship exists between the actual resonant frequency of the cavity 112 and the length of the cylinder, $L_C$, such that deviations from the ideal cavity may be accounted for by calibrating each hydraulic cylinder family type.

In one embodiment, the position determining means 118 determines the position of the piston and piston rod 104,106 by determining the resonant frequency of the coaxial resonant cavity 112. The resonant frequency of the coaxial resonant cavity 112 is a function of the frequency signals. In the preferred embodiment, the present invention measures frequency by measuring the periods.

For example, in one embodiment, the receiving section 116 tracks the frequency of the positive slope intercept. The frequency is then adjusted to account for the difference between the threshold value and actual resonance. The adjusted value is then used as the resonant frequency of the coaxial cavity 112.

In another example, the period of the resonant frequency is determined as a function of the first and second frequency signals (corresponding to the positive and negative slope intercept conditions, respectively). Generally:

$$P_{res} = f(P_1 + P_2) \qquad \text{EQU. 2}$$

where, $P_1$ and $P_2$ are the measured periods corresponding to the first and second frequency signals, $f_1$ and $f_2$. In one embodiment, the period of the resonant frequency is given by the equation:

$$P_{res} = (P_1 + P_2)/2. \qquad \text{EQU. 2A}$$

In another embodiment, the period of the resonant frequency is given by the equation:

$$P_{res} = (P_1 + P_2)/2 + \frac{P_u - (P_u^2 + (P_1 - P_2)^2)^{\frac{1}{2}}}{2} \qquad \text{EQU. 2B}$$

where $P_u$ is a parameter based upon cylinder dimensions and position.

Figure 2:
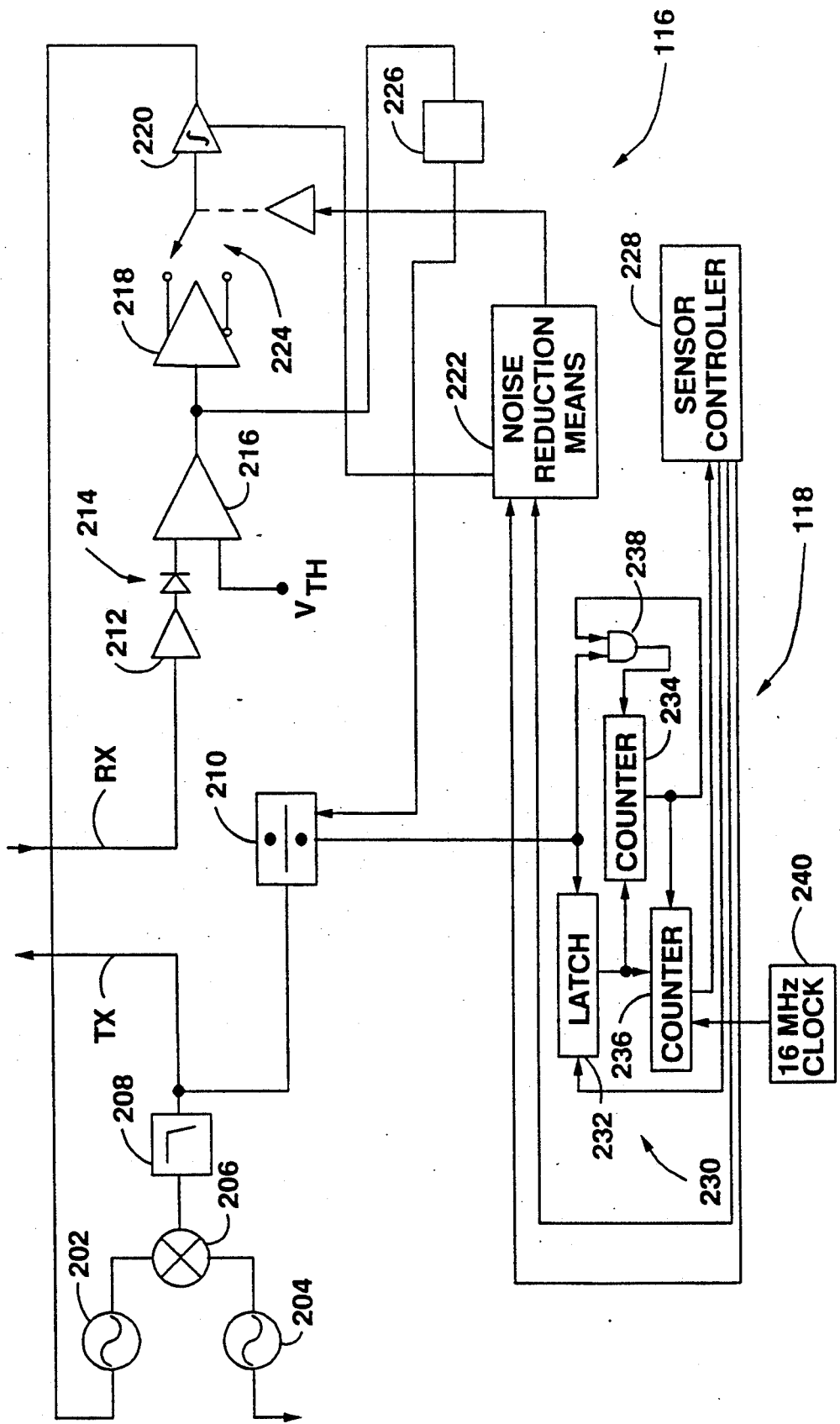
FIG. 2 illustrates a more detailed functional block diagram of the R linear position sensor, according to the embodiment of the present invention of FIG. 1.

With reference to FIG. 2, a block diagram of the transmitting section 114 and the receiving section 116 according to the preferred embodiment, is shown. The transmitting section includes first and second voltage controlled oscillators (VCO) 202,204. A balanced mixer 206 combines the output of the first and second VCO's 202,204. A lowpass filter 208 connects the output of the mixer 206 to the transmitting coupling element 122. An RF amplifier (not shown) may be needed to amplify the output of the lowpass filter 208.

The receiving section 116 includes an RF amplifying means 212 for amplifying the signal from the receiving coupling element 120. The amplifying means includes means for equalizing said received electromagnetic signal. The equalizing means accounts for the insertion losses of the hydraulic cylinder 108. This allows the received signal to be compared with a constant threshold value.

In the preferred embodiment, the impedance of the equalizing means of the RF amplifying means 212 is substantially equal to the inverse of the impedance of the hydraulic cylinder 100 over the frequency range defined by the minimum and maximum values. The gain of the equalizing means approaches a predetermined maximum as the frequency of said electromagnetic signal approaches the minimum value. The gain of the equalizing means approaches a predetermined minimum as the frequency of said electromagnetic signal approaches the maximum value.

A prescaler 210 scales the frequency of the output of the lowpass filter 208. In the preferred embodiment, the prescaler 210 divides the frequency of the output of the low pass filter 208 by 256 and responsively produces a frequency signal.

A means 214 receives the output of the RF amplifier/equalizer 212 and responsively produces a detected signal indicative of the amplitude of the electromagnetic wave signal.

An amplifying means 216 amplifies the output of the detecting means 214 compared with a predetermined value or threshold, $V_{TH}$.

An invert/non-invert amplifying means 218 amplifies the output of the RF amplifier/equalizer 212 and provides an inverted output and a non-inverted output.

An integrating means 220 integrates the output of the invert/non-invert amplifier 218.

A means 222 receives control signals from the controlling means 118 and conditions the signals, that is, filtering and noise reduction.

A switching means 224 switches between the inverting and non-inverting outputs of the amplifier 218.

A lock detecting means 226 signals the controlling means 118 when frequency lock occurs.

The controlling means 118 includes a sensor controller 228 and a counting means 230. In the preferred embodiment, the sensor controller 228 is microprocessor based. One suitable microprocessor is available from Motorola Inc. of Roselle, Ill. as part no. MC68HC11. In the preferred embodiment, the microprocessor is adapted to receive information from the counting means 230, determine the position, velocity, and acceleration of the piston and piston rod 104,106, and relay the data to an external user.

For example, in an automatic control position system for a construction vehicle, the position and/or velocity and/or acceleration of the piston and piston rod 104,106 are used to control the position/movement of the vehicle's linkage. Typically, a separate control system is used.

In the preferred embodiment, the counting means 230 counts the output pulses of the prescaler 210. In the preferred embodiment, the counting means 230 includes a latch or flip-flop 232, a first counter 234, a second counter 236, and an AND logic gate 238, as shown.

Figure 3:
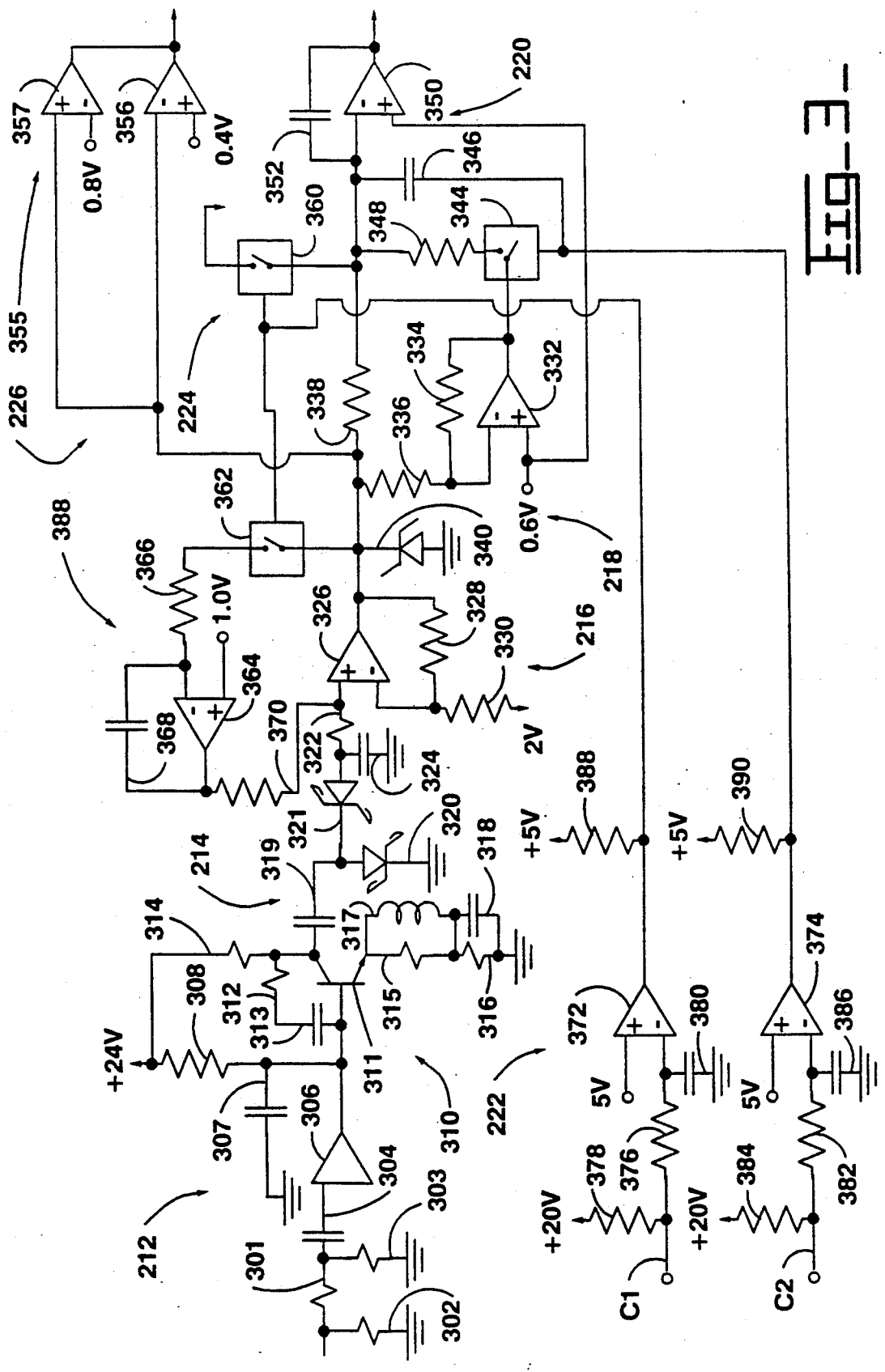
FIG. 3 is an electrical schematic of the receiving section of FIG. 2.

With reference to FIG. 3, an electrical schematic of the receiving section 116 is shown. A first resistor 301 connects the receiving coupling element 120 to a first capacitor 304. Second and third resistors 302,303 connect opposite ends of the first resistor 301 to electrical ground. The first capacitor 304 is connected to the input of a first amplifier 306. A second capacitor 307 connects the output of the first amplifier 306 to electrical ground. A fourth resistor 308 connects the output of the first amplifier 306 to positive 24 volts.

The equalizing means of the RF amplifying means 212 includes an equalizer circuit 310. In the preferred embodiment, the equalizer circuit 310 includes a first NPN transistor 311. A fifth resistor 312 and a third capacitor 313 connected in series connects the collector of the first NPN transistor 311 to the base. A sixth resistor 314 connects the collector to +24 volts. Seventh and eighth resistors 315,316 connected in series connects the emitter of the first NPN transistor 311 to electrical ground. A first inductor 317 and a fourth capacitor 318 is are connected in parallel with the seventh and eighth resistors 315,316, respectively, as shown. A fifth capacitor 319 connects the equalizer circuit 310 to the rest of the detecting means 214. The fifth resistor 312 and the third capacitor 313 constitute a first voltage gain component, $X_c$, and the seventh resistor 315 and the first inductor 317 constitute a second voltage gain component, $X_e$. The overall voltage gain of the equalizing means 212 is approximately $X_c/X_e$.

The detecting means 214 further includes a first Schottky barrier diode 320 connected between the fifth capacitor 319 and electrical ground. A second Schottky barrier 321 is connected to the anode of the first Schottky barrier diode 320. The anode of the second Schottky barrier diode 321 is connected to the first comparing means 216 through a ninth resistor 322. A sixth capacitor 323 connects the junction between the second Schottky barrier diode 321 and the ninth resistor 322 to electrical ground.

The first comparing means 216 includes a first operational amplifier 326. A tenth resistor 328 connects the output of the first operational amplifier 326 to the negative input terminal of the first operational amplifier 326. An eleventh resistor 330 connects the negative input terminal to +2 volts.

The inverting/non-inverting amplifying means 218 includes a second operational amplifier 332. A twelfth resistor 334 connects the output of the second operational amplifier 332 to the negative input terminal of the operational amplifier 332. A thirteenth resistor 336 connects the output of the first operational amplifier 326 to the negative input terminal of the second operational amplifier 332. The positive input terminal of the second operational amplifier 332 is connected to 0.6 volts. A fourteenth resistor 338 connects the output of the first operational amplifier 326 with the integrating means 220. A first Zener diode 340 connects the output of the first Op Amp 326 to electrical ground.

The output of the second operational amplifier 332 is connected to the output terminal of a first switch 344. The control terminal of the first switch 344 is connected to the integrating means 220 by a seventh capacitor 346. The input terminal of the first switch 344 is connected to the integrating means 220 by a fifteenth 348.

The integrating means 220 includes a third operational amplifier 350. An eighth capacitor 352 connects the output of the third operational amplifier 350 to the negative input terminal of the operational amplifier 350. The positive input terminal of the third operational amplifier 350 is connected to 0.6 volts.

The lock detect means 226 includes a window comparator 355. In the preferred embodiment, the window comparator 355 includes first and second comparators 356,357. The negative input terminal of the first comparator 356 is connected to 0.4 volts. The positive input terminal of the second comparator 357 is connected to 0.8 volts. The positive input terminal of the first comparator 356 and the negative input terminal of the second comparator 357 are connected to the output of the first operational amplifier 326.

The switching means 224 includes second and third switches 360,362. The control terminals of the second and third switches 360,362 are connected to the noise reduction means 222. The input terminal of the second switch 360 is connected to electrical ground. The output terminal of the second switch 360 is connected to the negative input terminal of the third Op Amp 350. The input terminal of the third switch 362 is connected to the negative input terminal of a fourth operational amplifier 364 through a sixteenth resistor 366. The output terminal of the third switch 362 is connected to the output of the first Op Amp. The positive input terminal of the fourth operational amplifier 364 is connected to 1 volt. The output of the fourth operational amplifier 364 is connected to the negative input terminal by a ninth capacitor 368. The output of the fourth operational amplifier 364 is also connected to its positive input terminal of the first operational amplifier by a seventeenth resistor 370.

The noise reduction means 222 includes third and fourth comparators 372,374. The positive input terminal of the third and fourth comparators 372,374 are connected to positive 5 volts. An eighteenth resistor 376 connects the negative input terminal of the third comparator 372 to a reset input line. A ninth resistor 378 connects the reset input line to +20 volts. A tenth capacitor 380 connects the negative input terminal of the third comparator 372 to electrical ground. A twentieth resistor 382 connects the negative input terminal of the fourth comparator 374 to a slope input line. A twenty-first resistor 384 connects the slope input line to positive +20 volts. An eleventh capacitor 386 connects the negative input terminal of the fourth comparator 374 to electrical ground.

The sensor controller 228 controls the operation of the sensor 102 through the control lines, C1 and C2.

INDUSTRIAL APPLICABILITY

With reference to the drawings and in operation, the RF linear position sensor 102 is adapted to determine the linear extension, velocity and acceleration of a hydraulic cylinder 108 for the purpose of providing feedback to an external control system.

The external control system uses information regarding a plurality of cylinders from respective sensors. Each sensor includes a transmitting section, a receiving section and a controlling means. However, each sensors' controlling means may be part of a master controlling means implemented on a single microprocessor.

Preferably, the microprocessor will determine the position, velocity, and acceleration of each hydraulic cylinder once during a control loop. The control loop is typically measured in milliseconds (ms), for example, 20 ms.

Each sensor will be started at the same time. When a slope intercept condition has been detected and the period measure the controller will read the appropriate counter. After each cycle, the controller will calculate the position, velocity, and acceleration of each cylinder and store the data in memory.

The receiving section includes an equalizing means for the purpose of equalizing the received signal. The equalization of the received signal adjusts the signal to correct for the insertion losses of the hydraulic cylinder. The effect of the equalization is to allow the equalized received signal to be compared with a threshold having a constant magnitude without adverse effects to the sensor's accuracy.

Other aspects, objects, and advantages of the present invention can be obtained from a study of the drawings, the disclosure, and the appended claims.

I claim:

1. An apparatus for detecting a linear position of a piston and a piston rod being movable within a housing of a hydraulic cylinder, comprising:
    means for producing an electromagnetic signal and delivering said electromagnetic signal into said hydraulic cylinder, said electromagnetic signal having a frequency varying between predetermined minimum and maximum values;
    means for determining a resonant frequency of the hydraulic cylinder, said resonant frequency detecting means including means for sensing an electromagnetic wave signal within said hydraulic cylinder and equalizing said received electromagnetic signal, said equalization accounting for the losses of said hydraulic cylinder, comparing said equalized electromagnetic wave signal with a predetermined constant and responsively producing a frequency signal, said frequency signal being indicative of said resonant frequency; and
    means for receiving said frequency signal and responsively determining the position of said piston and piston rod.

2. An apparatus, as set forth in claim 1, wherein said piston, piston rod, and housing define a variable length coaxial cavity and said electromagnetic signal is a transverse electromagnetic wave delivered into said coaxial cavity.

3. An apparatus, as set forth in claim 1, wherein said position determining means includes means for determining a resonant frequency of said coaxial cavity and wherein the position of said piston and piston rod is determined as a function of said resonant frequency.

4. An apparatus, as set forth in claim i, wherein said comparing means includes means for detecting the amplitude of said electromagnetic wave signal and responsively producing a detected signal.

5. An apparatus, as set forth in claim 1, wherein an impedance of said equalizing means is substantially equal to the inverse of the impedance of said hydraulic cylinder over the frequency range defined by said minimum and maximum values.

6. An apparatus, as set forth in claim 1, wherein the gain of said equalizing means approaches a predetermined maximum as the frequency of said electromagnetic signal approaches said minimum value.

7. An apparatus, as set forth in claim 1, wherein the gain of said equalizing means approaches a predetermined minimum as the frequency of said electromagnetic signal approaches said maximum value.

8. An apparatus, as set forth in claim 1, wherein said equalizing means includes a first voltage gain component, $X_c$, and a second impedance voltage gain, $X_e$, and wherein the overall voltage gain of said equalizing means is approximately $X_c/X_e$.

9. An apparatus, as set forth in claim 8, wherein said first voltage gain component includes a first resistor and a capacitor connected in series.

10. An apparatus, as set forth in claim 8, wherein said second voltage gain component includes a second resistor and a first inductor connected in parallel.

11. An apparatus, as set forth in claim 8, wherein said first voltage gain component includes a first resistor and a capacitor connected in series and said second voltage gain component includes a second resistor and a first inductor connected in parallel.

12. An apparatus, as set forth in claim 1, wherein said equalizing means includes:
    a transistor;
    a first resistor connected to the collector of said transistor;
    a capacitor connected between said first resistor and the base of said transistor, said first resistor and said capacitor being connected in series;
    a second resistor connected between the emitter of said transistor and ground; and
    an inductor connected in parallel with said second resistor.

13. An apparatus for detecting a linear position of a piston and a piston rod being movable within a housing of a hydraulic cylinder, comprising:
    means for producing an electromagnetic signal and delivering said electromagnetic signal into said hydraulic cylinder, said electromagnetic signal having a frequency varying between predetermined minimum and maximum values;
    means for determining a resonant frequency of the hydraulic cylinder, said resonant frequency detecting means including means for sensing an electromagnetic wave signal within said hydraulic cylinder and equalizing said received electromagnetic signal, said equalization accounting for the losses of said hydraulic cylinder, comparing said equalized electromagnetic wave signal with a predetermined constant and responsively producing a frequency signal; wherein said equalizing means includes:
    a transistor;
    a first voltage gain component, $X_c$, connected between the collector and the base of said transistor;
    a second voltage gain component, $X_e$, connected to the emitter of said transistor; wherein the overall voltage gain of said equalizing means is approximately $X_c/X_e$; and
    means for receiving said frequency signal and responsively determining the position of said piston and piston rod.

* * * * *

UNITED STATES PATENT AND TRADEMARK OFFICE
CERTIFICATE OF CORRECTION

PATENT NO. : 5,182,979

DATED : February 2, 1993

INVENTOR(S) : Denny E. Morgan

It is certified that error appears in the above-identified patent and that said Letters Patent is hereby corrected as shown below:

Claim 4, column 8, line 38, after "claim" change "i" to --1--.

Signed and Sealed this

Twenty-third Day of November, 1993

Attest:

BRUCE LEHMAN

Attesting Officer
Commissioner of Patents and Trademarks